United States Patent [19]

Black et al.

[11] Patent Number: 4,518,407
[45] Date of Patent: May 21, 1985

[54] OPTICAL FIBRE PREFORM MANUFACTURE

[75] Inventors: Philip W. Black, Bishop's Stortford; John Irven, Stansted, both of England

[73] Assignee: International Standard Electric Corporation, New York, N.Y.

[21] Appl. No.: 124,380

[22] Filed: Feb. 25, 1980

[30] Foreign Application Priority Data

Mar. 7, 1979 [GB] United Kingdom ............... 7908088

[51] Int. Cl.³ .................... C03P 37/025; C03B 37/07
[52] U.S. Cl. .................................... 65/3.12; 65/3.11; 427/163
[58] Field of Search .............. 65/3 A, 3.11, 3.12, 65/18.2; 427/163, 167, 237

[56] References Cited

U.S. PATENT DOCUMENTS

| | | | |
|---|---|---|---|
| 3,877,912 | 4/1975 | Shiraishi et al. | 65/3 A |
| 3,980,459 | 9/1976 | Li | 65/3 A X |
| 4,087,266 | 5/1978 | Irven et al. | 65/3 A X |
| 4,123,483 | 10/1978 | Nakahara et al. | 65/3 A X |
| 4,161,505 | 7/1979 | Shiraishi et al. | 65/3.12 X |
| 4,217,027 | 8/1980 | MacChesney et al. | 65/3.12 X |

FOREIGN PATENT DOCUMENTS

| | | | |
|---|---|---|---|
| 51-81143 | 7/1976 | Japan | 65/3 A |
| 1475496 | 6/1977 | United Kingdom . | |

Primary Examiner—Kenneth M. Schor
Attorney, Agent, or Firm—John T. O'Halloran; Robert P. Seitter

[57] ABSTRACT

A rod of silica 14 is inserted into a substrate tube 10 whose bore is lined with a layer 11 of material having a refractive index less than that of silica. This layer 11 is itself covered with a layer 12 of silica. The assembly of the rod and tube is drawn into fibre, or its components are fused together to form a solid cross-section optical fibre preform.

13 Claims, 1 Drawing Figure

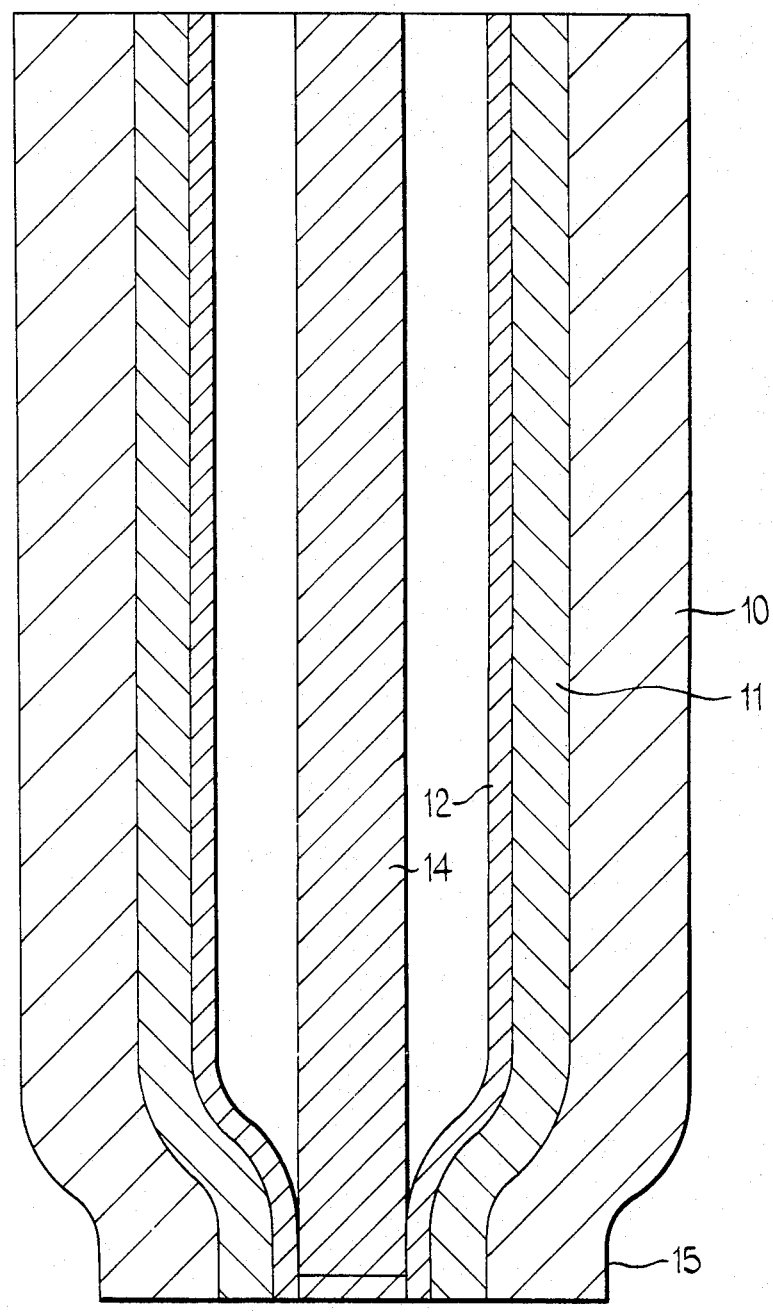

OPTICAL FIBRE PREFORM MANUFACTURE

This invention relates to optical fibre and optical fibre preform manufacture, and in particular to the manufacture of optical fibres and optical fibre preforms with silica cores.

The use of optical fibres in military communication and data transfer links offers considerable advantages due to their small size, light weight, and high security. Immunity to electromagnetic pulses also makes them attractive in this type of environment, except for an increase in optical attenuation which occurs after irradiation due to the creation of absorbing colour centres. The degree of attenuation change and the rate and extent of recovery are all vital considerations for the assessment of optical systems potential. It has been found that pure silica exhibits a relatively fast recovery to preirradiated attenuation levels, whereas optical fibres with doped silica cores, particularly those doped with phosphorus pentoxide, can show a smaller transient attenuation increment, but this is followed by a slow recovery leading to a permanent residual attenuation increment. Therefore an optical fibre with an undoped silica core is attractive in applications in which fast recovery after irradiation is of particular importance.

In most systems there is also a demand for a large core size and high numerical aperture in order to minimise connector and launch losses. Additionally a wide operating temperature range, typically $-55°$ to $+155°$ C., is important, particularly in avionics applications. Plastics clad silica optical fibres have been considered for this type of application, but this use of plastics as an optical cladding material gives rise to additional problems in the manufacture of connectors and splices. Moreover plastics clad silica fibres tend to suffer from a poor temperature performance.

According to the present invention there is provided a method of making an optical fibre preform wherein the bore of a substrate tube is coated with a first layer of glass having a refractive index less than that of silica, wherein said layer is covered with a second layer which is of silica, and wherein of rod of silica is inserted into said coated substrate tube to form an assembly the components of which are fused together to form a solid cross-section optical fibre preform, or are fused together and drawn to form a solid cross-section optical fibre.

It might be thought that the second layer could be safely dispensed with, but we have found that the presence of the second layer significantly eases the task of obtaining a substantially defect-free interface between the rod and the bore of the coated tube. It is suspected that, in the absence of the silica layer, dopant material employed in the first layer to provide it with a low refractive index is liable to be evolved during the fusing together of the rod and tube, and that this impairs the quality of the interface. It is believed that the presence of the second layer serves to overcome this problem by inhibiting the evolution of dopant material which would have to diffuse through the thickness of the second layer before it could escape.

Preferred materials for the first layer are silica doped with fluorine, silica doped with boric oxide, or silica doped with both fluorine and boric oxide.

In order to minimise transmission loss attributable to the presence of hydroxyl groups in the fibre it is preferred to deposit the two layers using a deposition reaction from which hydrogen and its compounds are excluded. For the same reason it is preferred to choose a silica rod also made of material produced by a deposition reaction from which hydrogen and its compounds are excluded. If it is found that the choice of a hydroxyl group contaminated substrate tube gives rise to significant hydroxyl absorption, as a result of migration of such groups from the substrate tube into the layers deposited upon its bore, a composite substrate tube may be used. This has an inner part consisting of a tubular layer lining the bore of an outer part. The inner part is made of silica deposited upon this outer part by a reaction from which hydrogen and its compounds are excluded so that it will tend to inhibit such migration.

Within the category of deposition reactions from which hydrogen and its compounds are excluded a preferred class of reactions is that of the direct oxidation of halides with oxygen. Such reactions may be promoted by the action of heat or by a plasma process.

There follows a description of methods of manufacturing optical fibre and optical fibre preform embodying the invention in preferred forms. The description refers to the accompanying drawing which depicts a state in the manufacture of a fibre when a portion of the coated tube has been fused to the rod that threads its bore.

Using deposition apparatus substantially as described in British Pat. No. 1,475,496, the bore of a 14×12 mm silica substrate tube 10 was coated with a 0.3 mm thick first layer 11, and then coated with a 0.1 mm thick second layer 12. Both layers were deposited by thermally induced direct oxidation reactions in which halides entrained in oxygen were caused to flow through the substrate tube 10 while a furnace arrangement producing a localised hot zone, and comprising an oxyhydrogen burner with a plurality of jets, was repetitively traversed along the tube. The first layer 11 was composed of silica doped with boric oxide, and was produced by reacting silicon tetrachloride and boron tribromide vapours with dry oxygen gas. For this purpose a first stream of oxygen gas was passed at the rate of about 200 cc/min through silicon tetrachloride at room temperature, a second stream of oxygen gas was passed also at the rate of about 250 cc/min through boron tribromide at room temperature, and these two gas streams were then combined with a third gas stream of pure oxygen having a flow rate of about 1 liter per minute. (The third gas stream was provided to dilute the concentration of halides). The second layer 12 was produced under substantially the same conditions, but with the flow through the boron tribromide shut off. In each instance the deposit was formed as a vitreous layer, rather than a particulate one requiring consolidation as a separate sintering step.

Next a 6 mm diameter silica rod 14, made by a deposition reaction from which hydrogen and its compounds were excluded so as to be substantially devoid of hydroxyl group contamination, was inserted into the coated tube, and the two components mounted co-axially in a lathe in such a way that the rod and tube would be synchronously rotated about their common axis. Then, while the assembly was rotated, a region 15 near one end was locally heated to cause the coated tube to soften and collapse on to the rod and fuse to it.

The assembly was next removed from the lathe and mounted vertically in a fibre drawing tower, with the fused end at the lower end of the assembly. At the upper end of the assembly, the rod and tube were separately clamped so that they were prevented from moving out of co-axial alignment when the lower end was heat softened. The fused end of the assembly was then introduced into the furnace of the fibre pulling tower where it softened enabling solid cross-section fibre to be drawn at a rate of about 10 meters per minute from the furnace as the assembly was progressively lowered into it. The drawn fibre was cooled immediately beneath the furnace with a forced draft of nitrogen, and then, on line with the drawing process, it was led through a vessel filled with a coating liquid to provide the freshly drawn fibre with a plastics coating to protect it from atmospheric attack. The coated fibre was taken up on a reel.

The resulting fibre had a core diameter of 250 microns, an optical cladding diameter (material of the first layer 11) of 290 microns, and an overall diameter, excluding the plastics coating, of 400 microns. The numerical aperture was approximately 0.12.

It has been found that, while it is possible to draw solid cross-section fibre with a properly centrallised core from the rod and core assembly without first collapsing the end of the tube on to the rod, the use of this collapse process step makes the task of controlling the gemoetry much easier. Another way of facilitating the control of the geometry is to apply the process previously used for collapsing one end, and to transverse the collapse up substantially the whole length of the assembly so as to form a solid cross-section optical fibre preform. In this instance the entire collapsing process may be carried out on a single transverse of the heating zone, but alternatively the traverse which actually brings the wall of the tube into contact with the rod may be preceded by one or more preliminary traverse designed progressively to shrink the bore of the tube to a dimension more nearly matching that of the rod. An advantage of collapsing the tube on to the rod over substantially the whole of their length is that it produces a solid cross-section preform that is relatively compact and can readily be stored until required for the production of fibre.

Other batches of optical fibre were made using substantially the same process as described above, but in this instance the first layer 11 was in each case a fluorine doped silica layer instead of a boric oxide doped one. For this purpose a first stream of oxygen gas was passed at the rate of about 50 cc/min through silicon tetrachloride, and this was combined with a stream of silicon tetrafluoride at a flow rate of 100 cc/min and a second stream of oxygen at a flow rate of 250 cc/min. The numerical aperture of the fibres produced were in the range 0.15 to 0.17, depending upon precise deposition conditions.

Further batches of optical fibre were also made using substantially the same process as described above, but in this instance the first layer 11 was in each case a silica layer doped with both fluorine and boric oxide. For this purpose a first stream of oxygen gas was passed at a rate of about 50 cc/min through silicon tetrachloride, and this was combined with a stream of boron trifluoride at a flow rate of 250 cc/min and a second stream of oxygen also at a flow rate of 250 cc/min. This produced fibre with a numerical aperture of about 0.22.

In the foregoing examples the choice of slower flow rates for those depositions that included the use of fluorine compounds was occasioned solely because different apparatus was used for mixing the reagent gases and vapours, and this particular apparatus happened not to be able to handle flow rates as large as the other.

We claim:

1. A method of fabricating an optical fibre preform by utilizing a silica substrate tube having a first index of refraction comprising the steps of:
   coating said tube with a first layer of silica including a dopant sufficient to provide a cladding layer exhibiting an index of refraction less than that of said silica tube,
   coating said first layer with an inhibiting layer of substantially undoped silica to provide a barrier to prevent migration of said cladding layer dopant across said inhibiting layer,
   inserting a substantially undoped silica rod coaxially into said coated tube to provide a core of said optical fibre preform, and
   fusing together said coated tube and said rod to form a solid cross-section optical fibre preform.

2. A method of fabricating an optical fibre perform by utilizing a silica substrate tube having a first index of refraction comprising the steps of:
   coating said tube with a first layer of silica including a dopant sufficient to provide a cladding layer exhibiting an index of refraction less than that of said silica tube,
   coating said first layer with an inhibiting layer of substantially undoped silica to provide a barrier to prevent migration of said cladding layer dopant across said inhibiting layer,
   inserting a substantially undoped silica rod coaxially into said coated tube to provide a core of said optical fibre preform,
   holding said coated tube and said rod on a common axis, heating and collapsing and tube onto said rod, and fusing together said tube and said rod to form a solid cross-section optical fibre preform.

3. A method of making an optical fibre preform as claimed in claim 1 or 2, wherein said first layer of silica contains a dopant selected from the group consisting of boric oxide, fluorine, and boric oxide and fluorine.

4. A method of making an optical fibre preform as claimed in claim 1 or 2, wherein said first layer and said inhibiting layer are deposited by a reaction from which hydrogen and its compounds are excluded.

5. A method as claimed in claim 1 or 2, wherein said first layer and said inhibiting layer are formed of material produced by the direct oxidation of halides with oxygen.

6. A method as claimed in claim 1 or 2, wherein the substrate tube is a composite structure comprising an outer part and an inner part lining the bore of said outer part, said inner part being made of a material deposited upon the outer part by a reaction from which hydrogen and its compounds are excluded.

7. A method of making an optical fibre preform as claimed in claim 1 or 2, wherein said substantially undoped silica rod is produced by a reaction from which hydrogen and its compounds are excluded.

8. A method of fabricating an optical fibre by utilizing a silica substrate tube having a first index of refraction comprising the steps of:
   coating said tube with a first layer of silica including a dopant sufficient to provide a cladding layer exhibiting an index of refraction less than that of said silica tube, coating said first layer with an inhibiting layer
   of substantially undoped silica to provide a barrier to prevent migration of said cladding layer dopant across said inhibiting layer, inserting a substantially undoped silica rod coaxially into said coated tube to provide a core of said optical fibre preform, holding said coating tube and said rod on a common axis, heating and collapsing one end of said tube onto said rod, commencing with the collapsed end, introducing said tube and said rod coaxially into a furnace, causing progessive collapsing and fusing of said tube onto said rod, and drawing a solid cross-section optical fibre from an end of the fused tube and rod.

9. A method of making an optical fibre as claimed in claim 8, wherein said first layer of silica contains a dopant selected from the group consisting of boric oxide, fluorine, and boric oxide and fluorine.

10. A method of making an optical fibre as claimed in claim 8, wherein said first layer and said inhibiting layer are deposited by a reaction from which hydrogen and its compounds are excluded.

11. A method as claimed in claim 8, wherein said first layer and said inhibiting layer are formed of material produced by the direct oxidation of halides with oxygen.

12. A method as claimed in claim 10 or 11, wherein the substrate tube is a composite structure comprising an outer part and an inner part lining the bore of said outer part, said inner part being made of a material deposited upon the outer part by a reaction from which hydrogen and its compounds are excluded.

13. A method of making an optical fibre as claimed in claim 8, wherein said substantially undoped silica rod is produced by a reaction from which hydrogen and its compounds are excluded.

* * * * *